April 16, 1957 G. VAN DONKERSGOED ET AL 2,789,257

TRANSISTOR

Filed April 14, 1954

INVENTORS
LEONARD JOHAN TUMMERS
GERRIT VAN DONKERSGOED

BY Fred M Vogel
AGENT 2,789,257
Patented Apr. 16, 1957

2,789,257

TRANSISTOR

Gerrit van Donkersgoed and Leonard Johan Tummers, Eindhoven, Netherlands, assignors, by mesne assignments, to North American Philips Company, Inc., New York, N. Y., a corporation of Delaware Application April 14, 1954, Serial No. 423,078

Claims priority, application Netherlands May 26, 1953

4 Claims. (Cl. 317—235)

The invention relates to a transistor consisting of a semi-conductive body comprising two electrodes arranged on opposite sides.

It is known to arrange such a semi-conductive body made, for example, of n-type germanium to be very thin at a point at which two point electrodes are arranged opposite each other. It has also been suggested to make one of these point electrodes from a determined metal, for example gold, and to subject the transistor to a determined current treatment with the resultant advantage that the crystal need not necessarily be so thin and consequently that its manufacture is facilitated.

However, in these known transistors it remains necessary to urge the two point contacts to opposite sides of the semi-conductive body so as to register exactly with the result that its assembly is more difficult than that of a transistor comprising two point electrodes arranged adjacent each other.

A further disadvantage which is also of a structural nature consists in that the dimensions of a transistor comprising two points arranged opposite each other are comparatively large and widely different from the dimensions of the normal transistors comprising two adjacent points.

According to the invention, the object of which is, among other things, to obviate these disadvantages, the transistor consists of a semi-conductive body to one side of which an electrode is sealed whilst a point electrode is arranged on the opposite side.

In a preferred embodiment the transistor is arranged in a manner known per se in a cylindrical metal casing which on one side comprises two contact studs.

In an alternative embodiment the transistor is arranged over a base in which in a manner known per se three contact studs are arranged parallel to each other, the point electrode being arranged parallel to the base.

The invention will now be described with reference to the accompanying drawing, in which two embodiments thereof are shown by way of example, and in which Fig. 1 is a perspective view of a transistor of the type comprising a cylindrical casing;

Figure 1:
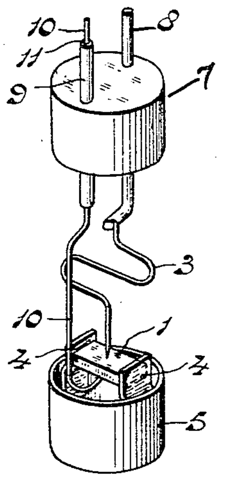
Figure 2:
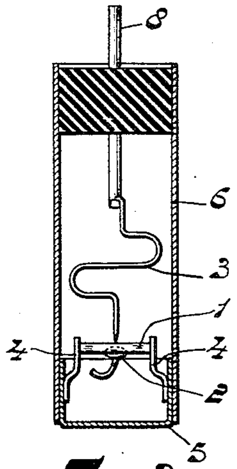
Fig. 2 is a vertical cross-sectional view of such a transistor.

The transistor shown in Figs. 1 and 2 consists of a semi-conductive mono-crystal 1 made up, for example, of n-type germanium to the bottom of which a small amount of indium 2 is sealed or fused. Due to the diffusion thereof into the germanium, the latter is locally converted into p-type material. A point electrode 3 is arranged on top of the crystal. Due to the comparatively extensive junction, i. e., the relatively large-area rectifying connection, between the electrode 2 and the crystal 1, the position of the electrode 3, which provides a relatively small-area rectifying connection to the crystal 1, can be chosen within wide limits so that it is aligned with the electrode 2 and thus its assembly presents little difficulty.

The crystal 1 is secured by soldering between two nickel strips 4 which in turn are secured in a cap 5 and which constitutes a base ohmic connection to the crystal 1. This cap is clamped in a tubular casing 6. An insulating plug 7 comprising two contact studs 8 and 9 is clamped in the upper end of the casing. The stud 8 carries the point electrode whilst the stud 9 is hollow so as to permit a wire 10 which is soldered to the electrode 2 to be passed through this stud. Thus, this wire can be shortened when the point electrode 3 and the crystal 1 are brought together; when these parts have been moved into position the wire 10 is secured by soldering at 11.

Figure 3:
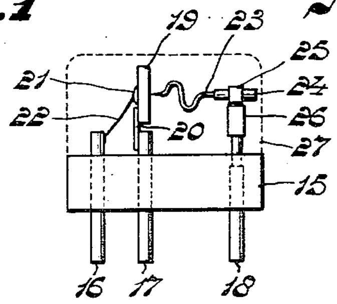
Fig. 3 is a side view of a transistor of the type comprising a base provided with three studs.

This transistor can be dimensioned so as to permit its being interchanged with a usual transistor comprising two points. The transistor shown in Fig. 3 is shaped into a different form. It is built on an insulating base 15 comprising three adjacent studs 16, 17 and 18.

A semi-conductive crystal 19 is secured to a stud 17 by interposition of a nickel strip 20, which constitutes the base connection. A diffusion electrode 21 is connected to a stud 16 by means of a conductor 22. The point electrode 23, which is substantially aligned with the diffusion electrode 21, is secured to a stud 24 which is clamped in an eyelet 25 so as to be able to move therein, which eyelet is arranged on a tubular member 26. This member is in turn capable of moving over a contact stud 18. Thus the point electrode is easily adjustable.

The entire transistor is embedded in an insulating mass 27 shown by a broken line and engaging the base 15.

Since in this transistor only one point contact is provided, the aggregate can be dimensioned so as to permit this transistor to be interchanged with the known type of transistor comprising two diffusion or fused contacts.

What is claimed is:

1. A transistor comprising a semi-conductive body, a base ohmic connection to said body, and two rectifying connections to opposite sides of said body and substantially aligned with each other, one of said rectifying connections comprising an electrode fused to and diffused into said body producing a relatively large-area junction, the other of said rectifying connections comprising a point electrode in contact with said body producing a relatively small-area junction.

2. A transistor comprising a cylindrical metal housing including a pair of spaced terminals electrically connected to the housing, a semi-conductive body mounted between said terminals and forming an ohmic connection therewith, a pair of electrodes within said housing and insulated from each other and from the housing, one of said electrodes being fused to and diffused into one side of said body and forming a relatively large-area rectifying connection thereat, the other of said electrodes forming a point contact with the opposite side of said body and a relatively small-area rectifying connection substantially aligned with the large-area rectifying connection.

3. A transistor as set forth in claim 2 wherein the semiconductive body extends at right angles to the axis of the housing, and an insulating plug secured to the housing supports the two electrodes.

4. A transistor comprising a base member, a semiconductive body, an ohmic connection to said body and supporting the latter on said base, an electrode on one side of said body and fused to and diffused into the body to produce a relatively large-area rectifying connection, and a point electrode in contact with the other side of said body and producing a relatively small-area rectifying connection aligned with the relatively large-area connection, said point electrode extending substantially parallel to the base, said electrodes being supported on said base.

References Cited in the file of this patent

UNITED STATES PATENTS

| | | |
|---|---|---|
| 2,561,411 | Pfann | July 24, 1951 |
| 2,563,503 | Wallace | Aug. 7, 1951 |
| 2,629,672 | Sparks | Feb. 24, 1953 |
| 2,633,489 | Kinman | Mar. 31, 1953 |
| 2,671,189 | Gaudlite | Mar. 2, 1954 |
| 2,680,220 | Starr et al. | June 1, 1954 |